US010137415B2

(12) United States Patent
Tanaka et al.

(10) Patent No.: US 10,137,415 B2
(45) Date of Patent: Nov. 27, 2018

(54) RECLAIMING DEVICE, METHOD, AND RECOVERY UNIT OF $CO_2$, $H_2S$, OR BOTH OF $CO_2$ AND $H_2S$

(71) Applicant: MITSUBISHI HEAVY INDUSTRIES, LTD., Tokyo (JP)

(72) Inventors: Hiroshi Tanaka, Tokyo (JP); Hiromitsu Nagayasu, Tokyo (JP); Takuya Hirata, Tokyo (JP); Atsuhiro Yukumoto, Tokyo (JP); Tsuyoshi Oishi, Tokyo (JP); Shinsuke Nakatani, Tokyo (JP)

(73) Assignee: MITSUBISHI HEAVY INDUSTRIES ENGINEERING, LTD., Yokohama-shi (JP)

( * ) Notice: Subject to any disclaimer, the term of this patent is extended or adjusted under 35 U.S.C. 154(b) by 395 days.

(21) Appl. No.: 15/032,154

(22) PCT Filed: Oct. 22, 2014

(86) PCT No.: PCT/JP2014/078110
§ 371 (c)(1),
(2) Date: Apr. 26, 2016

(87) PCT Pub. No.: WO2015/068576
PCT Pub. Date: May 14, 2015

(65) Prior Publication Data
US 2016/0256825 A1 Sep. 8, 2016

(30) Foreign Application Priority Data
Nov. 5, 2013 (JP) ................................. 2013-229324

(51) Int. Cl.
*B01D 53/14* (2006.01)
*B01D 53/18* (2006.01)
(Continued)

(52) U.S. Cl.
CPC ......... *B01D 53/96* (2013.01); *B01D 53/1425* (2013.01); *B01D 53/1462* (2013.01);
(Continued)

(58) Field of Classification Search
CPC ............ B01D 53/1425; B01D 53/1462; B01D 53/1468; B01D 53/1475; B01D 53/1493;
(Continued)

(56) References Cited

U.S. PATENT DOCUMENTS

| 9,623,366 | B2* | 4/2017 | Tsujiuchi | ........... B01D 53/1425 |
| 9,901,875 | B2* | 2/2018 | Tanaka | ................... B01D 53/52 |
| 2012/0125196 | A1* | 5/2012 | Woodhouse | ....... B01D 53/1425 |
| | | | | 95/193 |

FOREIGN PATENT DOCUMENTS

| EP | 3042712 A1 | 7/2016 |
| JP | 5-245339 A | 9/1993 |

(Continued)

OTHER PUBLICATIONS

Extended European Search Report dated Sep. 16, 2016, issued in counterpart Application No. 14860438.2. (8 pages).
(Continued)

*Primary Examiner* — Cabrena Holecek
(74) *Attorney, Agent, or Firm* — Westerman, Hattori, Daniels & Adrian, LLP

(57) ABSTRACT

Provided are a reclaimer 51 that introduces, through a branch line $L_{11}$, and stores a part 17a of an absorbent 17 regenerated in a regenerator of a recovery unit that recovers $CO_2$ or $H_2S$ in a gas, a first alkaline agent supply section 53A that supplies an alkaline agent 52 to the reclaimer 51, a heating section 54 that heats the absorbent 17 stored in the reclaimer 51 and to which the alkaline agent 52 has been mixed to obtain recovered vapor 61, a first vapor cooler 55A that cools the recovered vapor 61 discharged from the
(Continued)

reclaimer 51 through a vapor line $L_{12}$, a first gas-liquid separator 56A that separates a coexisting substance 62 entrained in the cooled recovered vapor 61 into a recovered absorption agent vapor (gas) 17b and the liquid coexisting substance 62 by gas-liquid separation, and an introduction line $L_{13}$ that introduces the recovered absorption agent vapor 17b separated in the first gas-liquid separator 56A into a regenerator 20.

3 Claims, 9 Drawing Sheets

(51) Int. Cl.
| | |
|---|---|
| *B01D 53/34* | (2006.01) |
| *B01D 53/52* | (2006.01) |
| *B01D 53/62* | (2006.01) |
| *B01D 53/78* | (2006.01) |
| *B01D 53/96* | (2006.01) |
| *C01B 17/16* | (2006.01) |

(52) U.S. Cl.
CPC ..... *B01D 53/1468* (2013.01); *B01D 53/1475* (2013.01); *B01D 53/1493* (2013.01); *B01D 53/18* (2013.01); *B01D 53/343* (2013.01); *B01D 53/52* (2013.01); *B01D 53/526* (2013.01); *B01D 53/62* (2013.01); *B01D 53/78* (2013.01); *C01B 17/167* (2013.01); *B01D 2251/00* (2013.01); *B01D 2251/304* (2013.01); *B01D 2251/604* (2013.01); *B01D 2252/204* (2013.01); *B01D 2252/20478* (2013.01); *B01D 2258/0283* (2013.01); *Y02C 10/04* (2013.01); *Y02C 10/06* (2013.01); *Y02P 20/152* (2015.11)

(58) Field of Classification Search
CPC ...... B01D 53/18; B01D 53/343; B01D 53/52; B01D 53/526; B01D 53/62; B01D 53/78; B01D 53/96; Y02C 10/04; Y02C 10/06; Y02P 20/152
See application file for complete search history.

(56) References Cited

FOREIGN PATENT DOCUMENTS

| | | |
|---|---|---|
| JP | 2008-238113 A | 10/2008 |
| JP | 2012-110805 A | 6/2012 |
| JP | 2012-529364 A | 11/2012 |
| WO | 2010/142716 A1 | 12/2010 |
| WO | 2012/067101 A1 | 5/2012 |
| WO | 2013/088731 A1 | 6/2013 |
| WO | 2013/143001 A1 | 10/2013 |

OTHER PUBLICATIONS

Translation of Written Opinion dated Jan. 20, 2015, issued in International Patent Application No. PCT/JP2014/078110. (6 pages).
International Search Report and Written Opinion dated Jan. 20, 2015, issued in counterpart International Application No. PCT/JP2014/078110 (6 pages).
English translation of Decision of a Patent Grant dated Mar. 29, 2016, issued in counterpart Japanese Patent Application No. 2013-229324 (3 pages).

* cited by examiner

RECLAIMING DEVICE, METHOD, AND RECOVERY UNIT OF $CO_2$, $H_2S$, OR BOTH OF $CO_2$ AND $H_2S$

FIELD

The present invention relates to a reclaiming device, a method, and a recovery unit of $CO_2$, $H_2S$, or both of $CO_2$ and $H_2S$.

BACKGROUND

In recent years, as a cause of global warming of the earth, the greenhouse effect due to $CO_2$ has been pointed out, and measures against the greenhouse effect is internationally imperative in terms of protection of the earth environment. Generation sources of $CO_2$ extend over every field of human activities that burn fossil fuels, and demands for suppression of emission of $CO_2$ tends to increase. In response to the demands, a method of bringing a flue gas in a boiler in contact with an amine-based $CO_2$ absorbent such as an alkanolamine aqueous solution, and removing and recovering $CO_2$ in the flue gas, and a method of storing the recovered $CO_2$ without emitting $CO_2$ to the air have been vigorously studied for power generation facilities such as thermal power stations that use a large amount of fossil fuels.

Conventionally, Patent Literature 1 discloses a method of removing $CO_2$ (carbon dioxide) and SOx (sulfur oxide) in a flue gas. This method includes a denitrification process of reducing NOx (nitrogen oxide) contained in a flue gas to perform denitrification treatment, a desulfurization process of bringing SOx contained in the flue gas in contact with calcium carbonate in slurry to perform desulfurization treatment, and a $CO_2$ desorption process of bringing the flue gas subjected to the denitrification treatment and the desulfurization treatment in countercurrent contact with an amine-based absorbent (alkanolamine aqueous solution) in an absorber to cause the absorbent to absorb $CO_2$ in the flue gas, and an absorbent regenerating process of obtaining a lean solution by removing $CO_2$ from a rich solution that has absorbed $CO_2$ in a regenerator and returning the lean solution to the absorber again. Then, in this method, to prevent a situation where a thermally stable salt resulted from oxidative degradation of alkanolamine by oxygen in the flue gas or a reaction of alkanolamine with residual NOx or residual SOx, and a solid such as dust contained in the flue gas are accumulated in a system that the absorbent, passes through, reclaiming is performed, which includes heating the absorbent in a reclaimer, concentrating a coexisting substance as sludge, and removing the deteriorated substance from the absorbent.

CITATION LIST

Patent Literature

Patent Literature 1: Japanese Laid-open Patent Publication No. 5-245339

SUMMARY

Technical Problem

However, in a conventional reclaiming operation, while ionic substances and solid substances having no vapor pressure, and high-boiling point substances are separated and removed as reclaimer residues, low-boiling point substances and substances having a vapor pressure similarly to absorption agents are entrained in recovered vapor recovered from the reclaimer. Therefore, there is a problem that separation/removal of absorbent coexisting component is insufficient.

Therefore, a reclaiming device that prevents the introduction of an absorbent coexisting component together with recovered vapor recovered from a reclaimer to a regenerator, when regenerating an absorbent in the reclaimer, has been desired.

In view of the foregoing, an objective of the present invention is to provide a reclaiming device, a method, and a recovery unit of $CO_2$, $H_2S$, or both of them, which can prevent entrainment of a fluid in a reclaimer with recovered vapor recovered from a reclaimer, and the introduction of an absorbent, coexisting component together with the recovered vapor to the regenerator.

Solution to Problem

The first aspect of the present invention in order to solve the above mentioned problem is a reclaiming device including a reclaimer configured to introduce and store a part of an absorbent regenerated in a regenerator of a recovery unit that recovers $CO_2$ or $H_2S$ in a gas, a first alkaline agent supply section configured to supply an alkaline agent, to the reclaimer, a heating section configured to heat the absorbent stored in the reclaimer and to which the alkaline agent has been mixed to obtain recovered vapor, a vapor cooler configured to cool the recovered vapor discharged from the reclaimer through a vapor line, a first gas-liquid separator configured to separate a coexisting substance entrained in the cooled recovered vapor into recovered absorption agent vapor and a liquid coexisting substance by gas-liquid separation, and an introduction line configured to introduce the recovered absorption agent vapor separated in the first gas-liquid separator to the regenerator.

The second aspect of the invention is the reclaiming device according to the first aspect, wherein the first vapor cooler includes a first cooler configured to perform cooling with reflux water from the regenerator, and a second cooler provided at a downstream side of a rich/lean solution heat exchanger disposed in a lean solution supply line, and configured to cool the recovered vapor with a rich solution.

The third aspect of the invention is a reclaiming device including a reclaimer configured to introduce and store a part of an absorbent regenerated in an regenerator of a recovery unit that recovers $CO_2$ or $H_2S$ in a gas, a first alkaline agent supply section configured to supply an alkaline agent, to the reclaimer, a heating section configured to heat the absorbent stored in the reclaimer and to which the alkaline agent has been mixed to obtain recovered vapor, a second vapor cooler configured to cool the recovered vapor discharged from the reclaimer through a vapor line, a first gas-liquid separator configured to separate a coexisting substance entrained in the cooled recovered vapor into recovered absorption agent vapor and a liquid coexisting substance by gas-liquid separation, a cooler configured to cool the separated recovered absorption agent vapor, a second gas-liquid separator configured to separate the recovered absorption agent vapor after cooling into a low-boiling point substance flue gas and a recovered absorbent by gas-liquid separation, a heat, exchanger configured to perform heat exchange of the liquid coexisting substance separated in the first gas-liquid separator with vapor condensed water from vapor supplied to the reclaimer to increase a temperature, a $CO_2$ absorber configured to bring the liquid coexisting substance after increase in the temperature and a $CO_2$ gas in contact, a second alkaline agent supply section configured to supply the alkaline agent to the liquid coexisting substance after absorption of $CO_2$, and a distiller configured to distill the liquid coexisting substance to which the alkaline agent has been supplied while introducing the $CO_2$ thereinto.

The fourth aspect of the invention is the reclaiming device according to the third aspect, wherein the second vapor cooler includes a first cooler configured to perform cooling with the liquid coexisting substance separated from the recovered vapor in the first gas-liquid separator by gas-liquid separation, a second cooler configured to perform cooling with reflux water from the regenerator, and a third cooler provided at a downstream side of a rich/lean solution heat exchanger disposed in a lean solution supply line, and configured to cool, with a rich solution, the recovered vapor after cooling with the second cooler.

The fifth aspect of the invention is the reclaiming device according to the third or fourth aspect, including a $CO_2$ gas introduction line configured to introduce the $CO_2$ discharged from the $CO_2$ absorber into the distiller, and a nitrogen supply section configured to introduce a nitrogen gas into the $CO_2$ gas introduction line.

The sixth aspect of the invention is a reclaiming method including, when recovering, in a reclaimer, a part of circulating absorbent that recovers $CO_2$ or $H_2S$ in a flue gas in a $CO_2$ or $H_2S$ recovery unit as recovered vapor, cooling the recovered vapor from the reclaimer, and then separating an entrained coexisting substance by gas-liquid separation to remove a liquid coexisting substance, and introducing recovered absorption agent vapor after the gas-liquid separation into an absorbent regenerator.

The seventh aspect of the invention is the reclaiming method according to the sixth aspect, including cooling the recovered absorption agent vapor to obtain a liquid recovered absorbent in the introducing the recovered absorption agent vapor after separation into the absorbent regenerator, heating the separated liquid coexisting substance, then bringing the liquid coexisting substance and a $CO_2$ gas in contact, and then supplying an alkaline agent, and distilling, in a distiller, the liquid coexisting substance into which the alkaline agent has been supplied while introducing the $CO_2$ thereto.

The eighth aspect of the invention is the reclaiming method according to the seventh aspect, wherein a nitrogen gas is added to the $CO_2$ gas to be introduced into the distiller.

The ninth aspect of the invention is a recovery unit of $CO_2$, $H_2S$, or both of $CO_2$ and $H_2S$, including an absorber configured to bring a gas containing $CO_2$, $H_2S$, or both of $CO_2$ and $H_2S$ and an absorbent in contact to remove $CO_2$, $H_2S$, or both of $CO_2$ and $H_2S$, an absorbent regenerator configured to regenerate a solution that has absorbed $CO_2$, $H_2S$, or both of $CO_2$ and $H_2S$ to obtain the absorbent, and the reclaiming device according to any one of the first to the fifth aspects, configured to extract a part of the absorbent regenerated in the regenerator, and to remove a coexisting substance in the absorbent, wherein the absorbent regenerated in the absorbent regenerator is circulated and reused in the absorber, and recovered vapor recovered from the reclaiming device is introduced into the regenerator.

Advantageous Effects of Invention

According to the present invention, by performing selective separation/removal of an absorbent coexisting component entrained in recovered vapor from a reclaimer, improvement of operation reliability including reduction of absorbent corrosiveness can be achieved. Further, improvement of absorption agent recovery performance can be achieved.

DESCRIPTION OF EMBODIMENTS

Hereinafter, favorable embodiments of the present invention will be described in detail with reference to the appended drawings. Note that the present invention is not limited by the embodiments, and when there is a plurality of embodiments, the present invention includes those obtained by combining the embodiments.

First Embodiment

While an employable process to remove $CO_2$, $H_2S$, or both of them in a gas of the present invention is not especially limited, an example of a removing device that removes $CO_2$ will be described with reference to FIG. 1.

Examples of gases to be treated by the present invention include a coal gasifier gas, a synthesis gas, a coke oven gas, a petroleum gas, a natural gas, and a combustion flue gas. However, the gases are not limited to these examples, and any gas can be employed as long as the gas contains an acid gas such as $CO_2$ or $H_2S$.

In the following embodiment, a flue gas containing $CO_2$ as the acid gas will be described.

Figure 1:
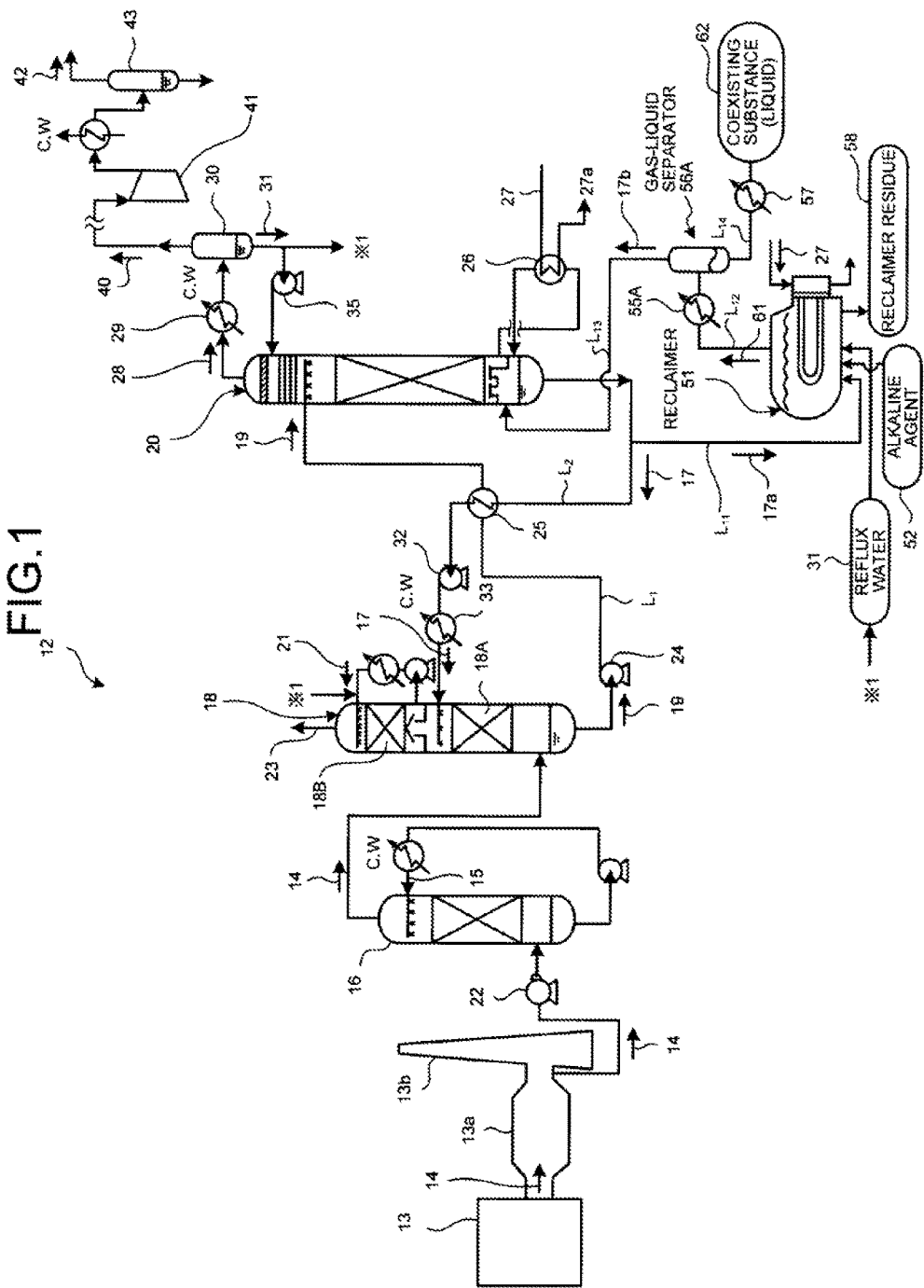
FIG. 1 is a schematic diagram of a $CO_2$ recovery unit according to a first embodiment.

FIG. 1 is a schematic diagram illustrating a configuration of a $CO_2$ recovery unit according to the first embodiment. As illustrated in FIG. 1, a $CO_2$ recovery unit 12 according to the first embodiment includes a flue gas cooling device 16 that cools a flue gas 14 containing $CO_2$ and $CO_2$ discharged from an industrial combustion facility 13 such as a boiler or a gas turbine with cooling water 15, a $CO_2$ absorber (hereinafter, also referred to as "absorber") 18 including a $CO_2$ recovery section 18A that brings the cooled flue gas 14 containing $CO_2$ and a $CO_2$ absorbent (hereinafter, also referred to as "absorbent") 17 that absorbs $CO_2$ in contact to remove $CO_2$ from the flue gas 14, and an absorbent regenerator (hereinafter, also referred to as "regenerator") 20 that desorbs $CO_2$ from a $CO_2$ absorbent (hereinafter, also referred to as "rich solution") 19 that has absorbed $CO_2$ to regenerate a $CO_2$ absorbent. Then, in the $CO_2$ recovery unit 12, the regenerated $CO_2$ absorbent (hereinafter, also referred to as "lean solution") 17 from which $CO_2$ has been removed in the absorbent regenerator 20 is reused in the $CO_2$ absorber 18 as the $CO_2$ absorbent.

Note that, in FIG. 1, the reference sign 13a is a flue gas duct, 13b is a stack, 27a is steam condensed water. There are two cases for the $CO_2$ recovery unit 12, which includes a case of providing the $CO_2$ recovery unit later to recover $CO_2$ from an already provided flue gas source, and a case of placing the $CO_2$ recovery unit along with a newly provided flue gas source at the same time. An openable/closable damper is installed to the stack 13b, and is closed at the time of an operation of the $CO_2$ recovery unit 12. Further, the damper is set to open when the operation of the $CO_2$ recovery unit 12 is stopped although the flue gas source is operated.

In a method of recovering $CO_2$ using the $CO_2$ recovery unit 12, first, a pressure of the flue gas 14 containing $CO_2$ from the industrial combustion facility 13 such as a boiler or a gas turbine is increased by a flue gas blower 22, and the flue gas 14 is then sent to the flue gas cooling device 16, cooled with the cooling water 15, and sent to the $CO_2$ absorber 18.

In the $CO_2$ absorber 18, the flue gas 14 is brought in countercurrent contact with the $CO_2$ absorbent 17 that is an amine absorbent according to the present embodiment, and $CO_2$ in the flue gas 14 is absorbed in the $CO_2$ absorbent 17 by a chemical reaction.

The $CO_2$-removed flue gas from which $CO_2$ has been removed in the $CO_2$ recovery section 18A is brought, in gas-liquid contact with circulating rinse water 21 containing the $CO_2$ absorbent supplied through a nozzle in a water cleaning section 18B of the $CO_2$ absorber 18, the $CO_2$ absorbent 17 entrained in the $CO_2$-removed flue gas is recovered, and then a flue gas 23 from which $CO_2$ has been removed is discharged outside the system.

Further, a pressure of the rich solution that is the $CO_2$-absorbed $CO_2$ absorbent 19 is increased by a rich solution pump 24, heated with the lean solution that, is the $CO_2$ absorbent 17 regenerated in the absorbent regenerator 20, in a rich/lean solution heat exchanger 25 disposed on a rich solution supply line $L_1$, and supplied to the absorbent regenerator 20.

The rich solution 19 discharged from an upper portion to an inside of the absorbent regenerator 20 causes an endothermic reaction by water vapor supplied from a bottom portion, and desorbs most of $CO_2$. The $CO_2$ absorbent that has desorbed a part or most of $CO_2$ in the absorbent regenerator 20 is called semi-lean solution. This semi-lean solution becomes the $CO_2$ absorbent (lean solution) 17 from which nearly all of $CO_2$ has been removed, when the semi-lean solution is about to reach the bottom portion of the absorbent regenerator 20. A part of the lean solution 17 is heated with water vapor 27 in a regenerating heater 26, and supplies water vapor to the inside of the absorbent regenerator 20.

Meanwhile, a $CO_2$-entrained gas 28 accompanied by the water vapor discharged from the rich solution 19 and the semi-lean solution in the regenerator is led from a top of the absorbent regenerator 20, the water vapor is condensed by a condenser 29, water is separated in a separation drum 30, and a $CO_2$ gas 40 is discharged outside the system and is separately compressed by a compressor 41 and recovered. This compressed/recovered $CO_2$ gas 42 is pressed into an oil field using an enhanced oil recovery method (EOR) or stored in an aquifer after through a separation drum 43 to achieve measurements against the global warming.

Reflux water 31 separated/refluxed from the $CO_2$-entrained gas 28 accompanied by the water vapor in the separation drum 30 is supplied to the upper portion of the absorbent regenerator 20 and the rinse water 21 side with a reflux water circulation pump 35.

The regenerated $CO_2$ absorbent (lean solution) 17 is cooled with the rich solution 19 in the rich/lean solution heat exchanger 25 disposed on an intersection of the rich solution supply line $L_1$ and a lean solution supply line $L_2$, then a pressure is increased by a lean solution pump 32, and the $CO_2$ absorbent (lean solution) 17 is cooled in a lean solution cooler 33 and is then supplied to the $CO_2$ absorber 18. Note that, in this embodiment, an outline has been merely described. Description is given omitting a part of devices that come with the $CO_2$ recovery unit.

A part of the $CO_2$ absorbent 17 regenerated in the absorbent regenerator 20 is branched at a branch line $L_{11}$ from the lean solution supply line $L_2$ and introduced into a reclaimer 51, and the water vapor 27 is supplied to indirectly heat the absorbent, so that a coexisting substance is separated.

Figure 2:
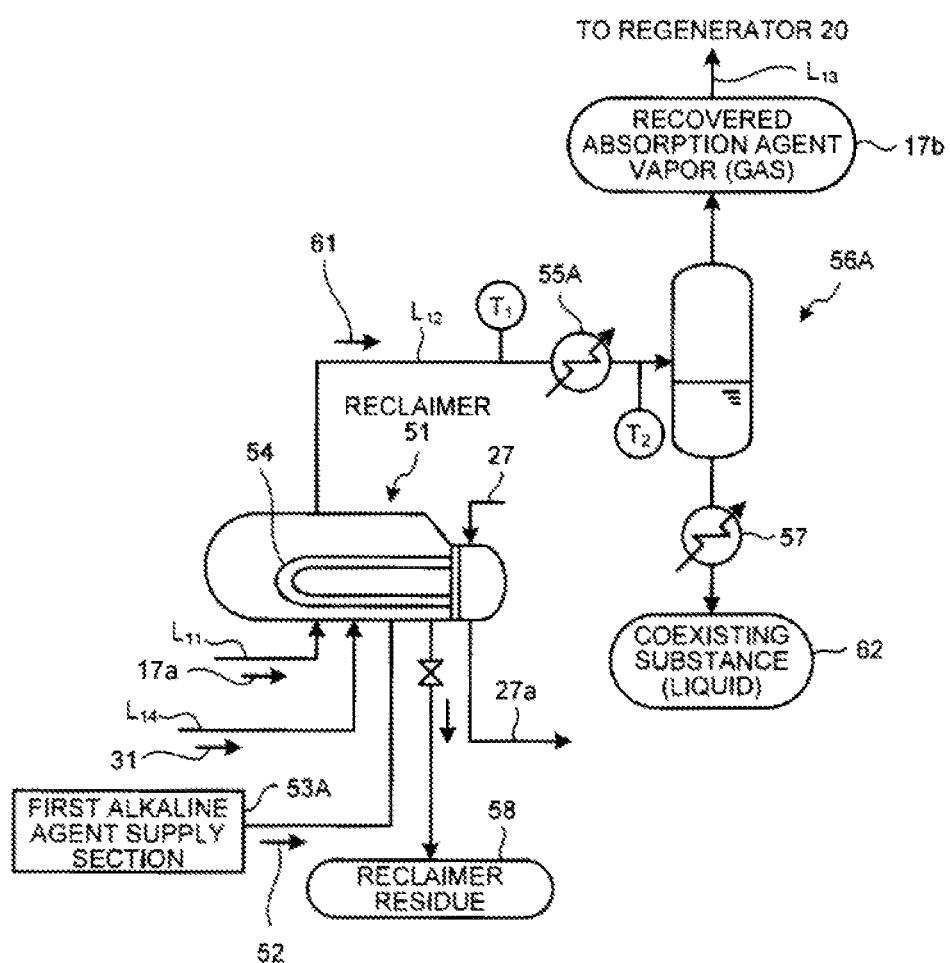
FIG. 2 is a schematic diagram of a reclaiming device according to the first embodiment.

FIG. 2 is a schematic diagram of a reclaiming device according to the first embodiment.

As illustrated in FIG. 2, a reclaiming device according to the present embodiment includes the reclaimer 51 that introduces, through a branch line $L_{11}$, and stores a part 17a of the absorbent 17 regenerated in the regenerator of the recovery unit that recovers $CO_2$ or $H_2S$ in a gas, a first alkaline agent supply section 53A that supplies an alkaline agent 52 to the reclaimer 51, a heating section 54 that heats the absorbent 17 stored in the reclaimer 51 and to which the alkaline agent 52 has been mixed to obtain recovered vapor 61, a first vapor cooler 55A that cools the recovered vapor 61 discharged from the reclaimer 51 through a vapor line $L_{12}$, a first gas-liquid separator 56A that separates a coexisting substance 62 entrained in the cooled recovered vapor 61 into recovered absorption agent vapor (gas) 17b and a liquid coexisting substance 62 by gas-liquid separation, and an introduction line $L_{13}$ that introduces the recovered absorption agent vapor 17b separated in the first gas-liquid separator 56A into the regenerator 20.

Note that, the reference sign 57 in the drawing illustrates a coexisting substance cooler that cools the coexisting substance (liquid) 62 after the gas-liquid separation, and the reference sign 58 illustrates a reclaimer residue.

The temperature of the recovered vapor 61 discharged from the reclaimer 51 is decreased by the first vapor cooler 55A by about 6 to 7° C.

In the reclaimer 51, the coexisting substance 62 having a vapor pressure is entrained in the recovered vapor 61. Therefore, the entrained coexisting substance 62 can be separated and removed by performing separation using the first gas-liquid separator 56A as in the present embodiment.

That, is, the coexisting substance 62 having a higher boiling point than amines in a free state of the absorbent is cooled in the first vapor cooler 55A, and the temperature is decreased by about 6 to 7° C., so that the coexisting substance 62 is liquefied and separated in the first gas-liquid separator 56A. When a temperature ($T_1$) of the recovered vapor 61 is 130° C., the recovered vapor 61 is cooled in the first vapor cooler 55A, and a temperature ($T_2$) of the recovered vapor 61 after cooling is made to 123° C., so that the coexisting substance (liquid) 62 can be separated.

An effect of the present embodiment will be described with reference to FIG. 7.

Figure 7:
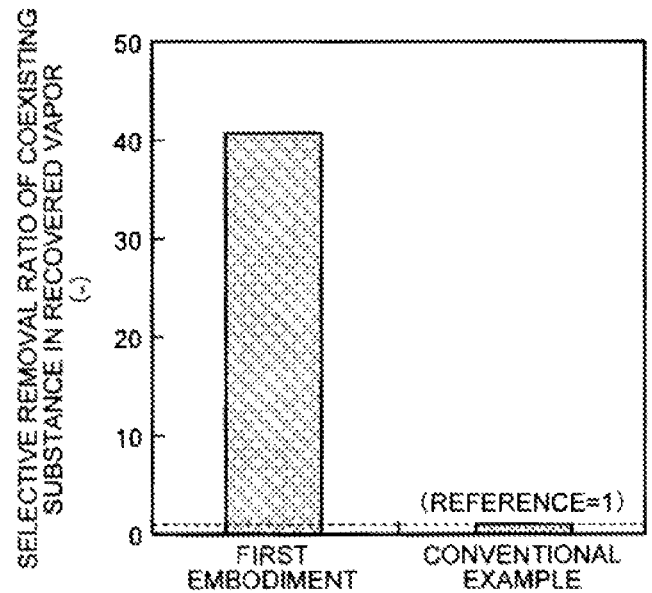
FIG. 7 is a diagram illustrating selective removal ratios in recovered vapor in a conventional example and the first embodiment.

FIG. 7 is a diagram illustrating selective removal ratios in recovered vapor in a conventional example and the first embodiment (where the conventional example is a reference (1)). The conventional technology is a case of recovering the recovered vapor 61 from the reclaimer 51 as it is without providing the gas-liquid separator as in the present embodiment.

The selection removal ratio of the coexisting substance 62 from the recovered vapor 61 in the present embodiment is 40, and the coexisting substance can be substantially removed, where the conventional example is the reference (1).

Figure 3:
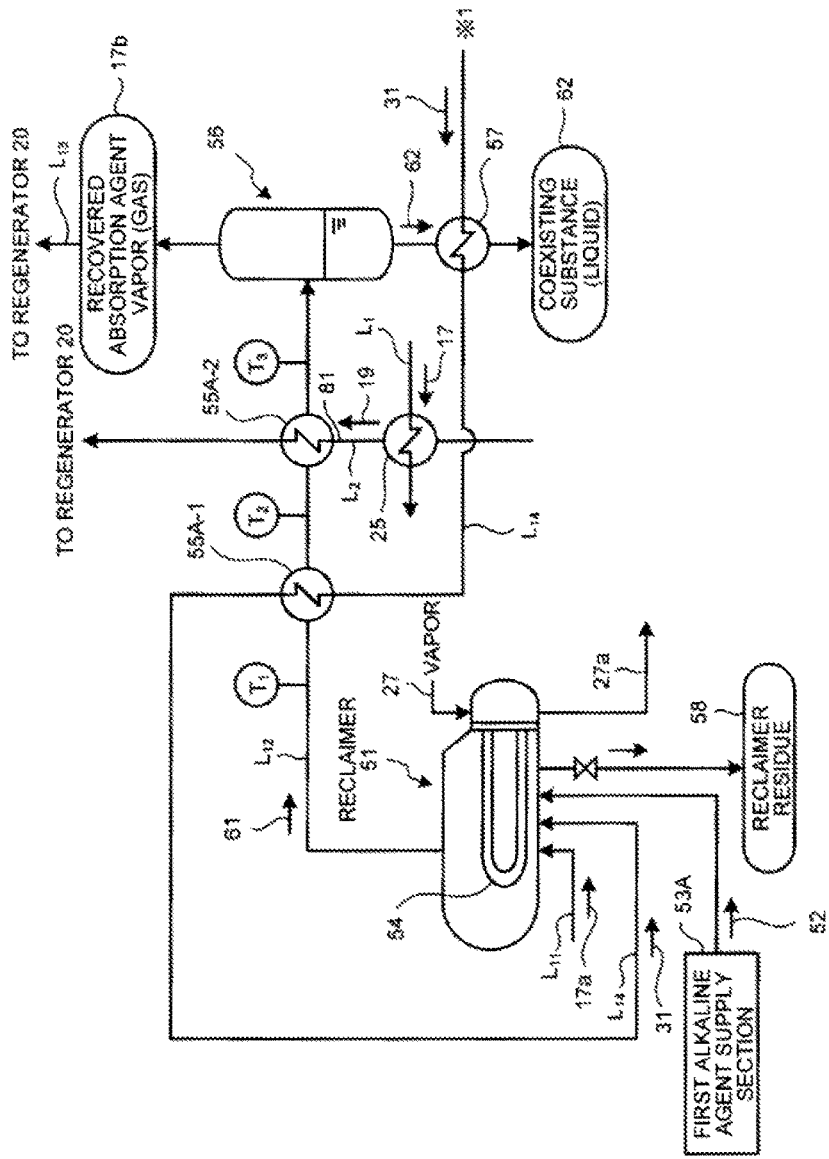
FIG. 3 is a schematic diagram of another reclaiming device according to the first embodiment.

Further, in the present embodiment, as illustrated in FIG. 3, a first cooler 55A-1 that performs cooling using the reflux water 31 from the regenerator 20 of the $CO_2$ recovery unit 12, and a second cooler 55A-2 provided at a downstream side of a rich/lean solution heat exchanger 25 disposed at an intersection of the rich solution supply line $L_1$ and the lean solution supply line $L_2$, and which cools the recovered vapor 61 with the rich solution 19 are included as the first vapor cooler 55A.

Accordingly, when the temperature ($T_1$) of the recovered vapor 61 is 130° C., the recovered vapor is cooled to the temperature ($T_2$=125° C.) by the first cooler 55A-1, and then cooled to a temperature ($T_3$=123° C.) by the second cooler 55A-2.

Here, the reflux water 31 is brought to pass through a coexisting substance cooler 57 for cooling the coexisting substance (liquid) 62 separated in the first gas-liquid separator 56A, and is then introduced into the first cooler 55A-1 through a cooling water line $L_{14}$.

The first cooler 55A-1 is provided at an intersection of the vapor line $L_{12}$ and the cooling water line $L_{14}$ and the second cooler 55A-2 is provided at an intersection of the vapor line $L_{12}$ and the rich solution supply line $L_1$, and thus cooling is possible with heat in the system of the $CO_2$ recovery unit 12.

Second Embodiment

Figure 4:
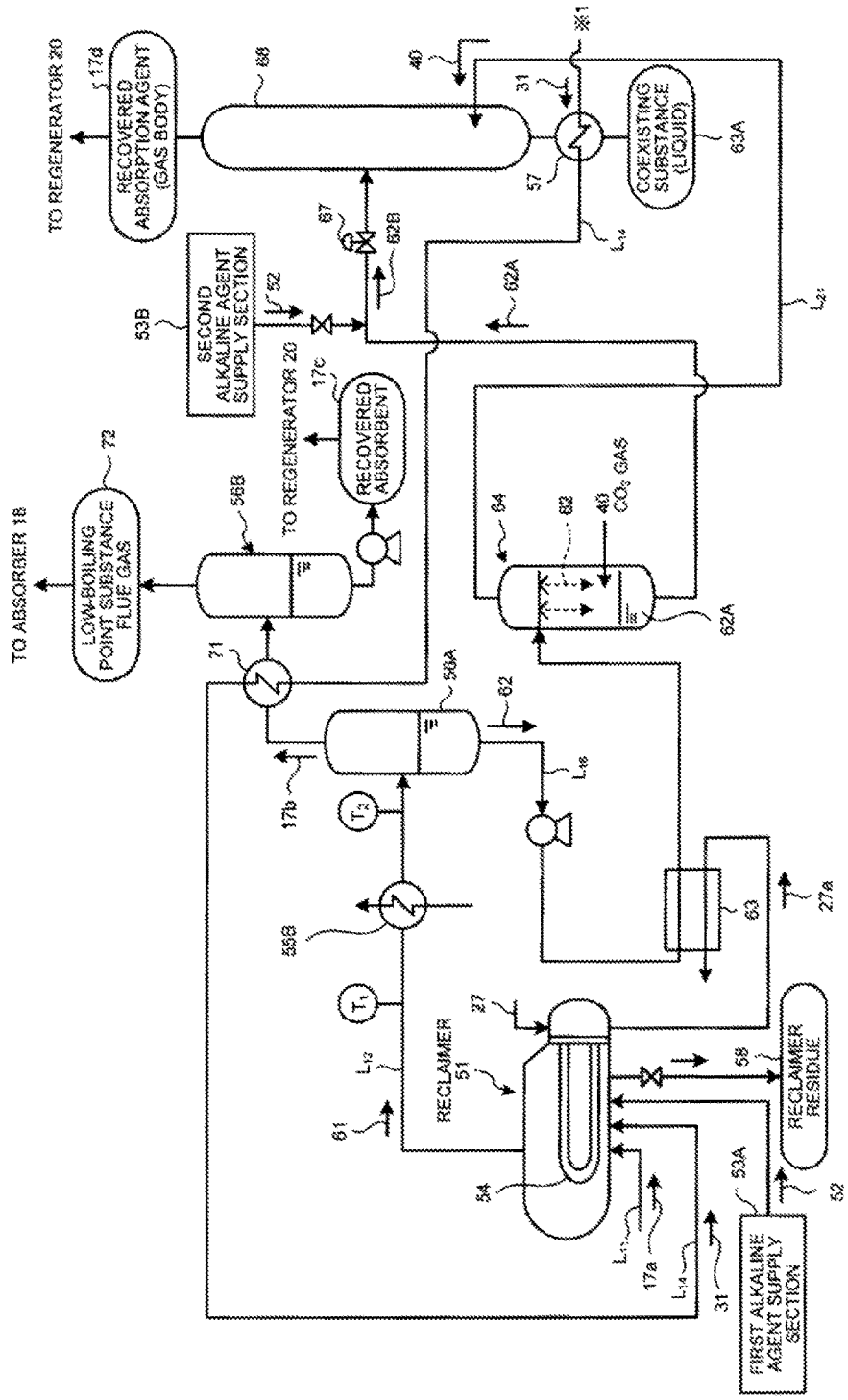
FIG. 4 is a schematic diagram of a reclaiming device according to a second embodiment.
Figure 5:
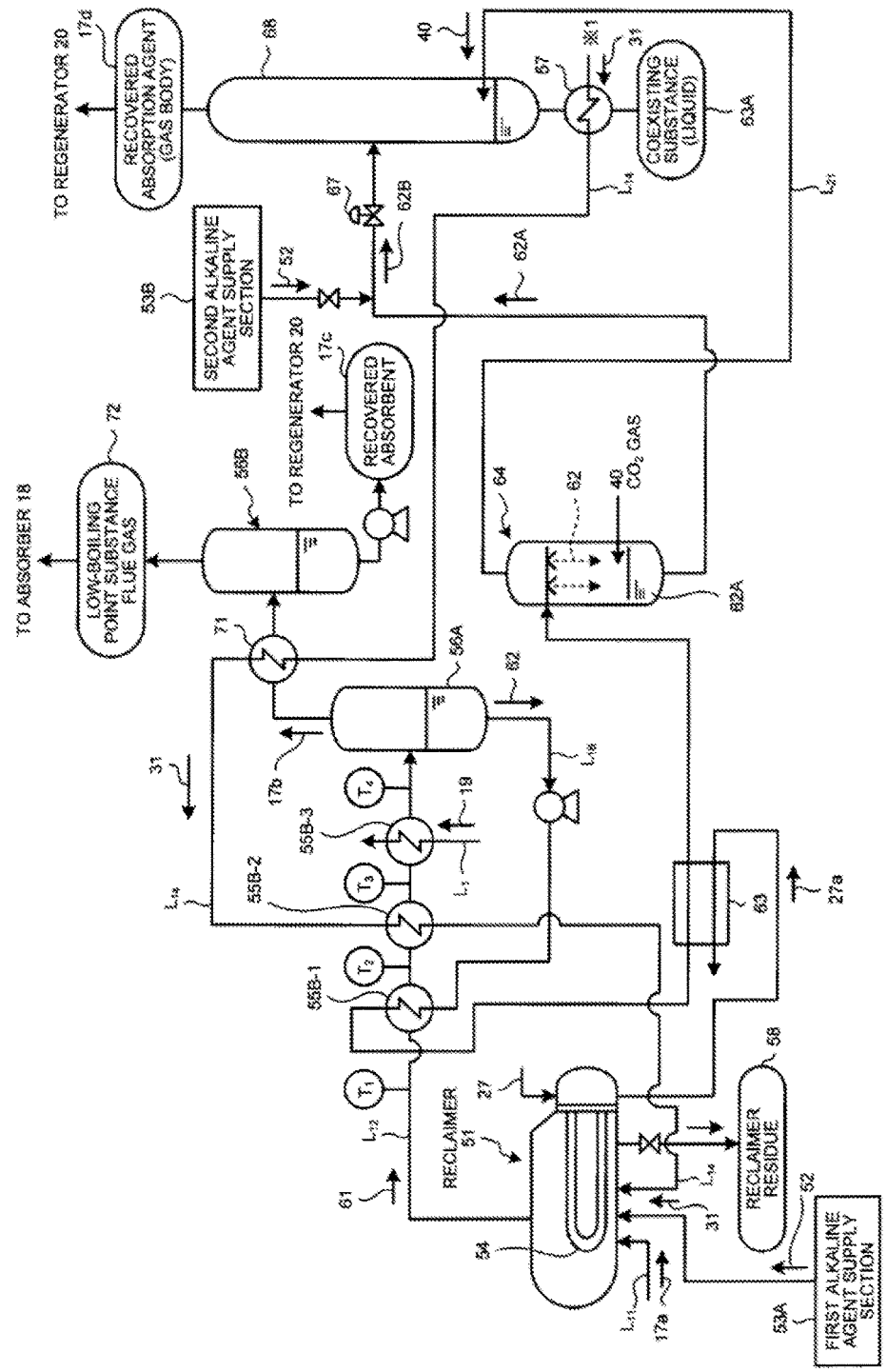
FIG. 5 is a schematic diagram of another reclaiming device according to the second embodiment.

A reclaiming device according to an embodiment of the present invention will be described with reference to the drawings. FIG. 4 is a schematic diagram of a reclaiming device according to a second embodiment. FIG. 5 is a schematic diagram of another reclaiming device according to the second embodiment. Note that the same member as the first embodiment is denoted with the same reference sign, and description thereof is omitted.

As illustrated in FIG. 4, a reclaiming device according to the present embodiment includes a reclaimer 51 that introduces, through a branch line $L_{11}$, and stores a part 17a of an absorbent 17 regenerated in a regenerator of a recovery unit that recovers $CO_2$ or $H_2S$ in a gas, a first alkaline agent supply section 53A that supplies an alkaline agent 52 to the reclaimer 51, a heating section 54 that heats the absorbent 17 stored in the reclaimer 51 and to which the alkaline agent 52 has been mixed to obtain recovered vapor 61, a second vapor cooler 55B that cools recovered vapor 61 discharged from the reclaimer 51 through a vapor line $L_{12}$, a first gas-liquid separator 56A that separates a coexisting substance 62 entrained in the cooled recovered vapor 61 into recovered absorption agent vapor (gas) 17b and a liquid coexisting substance 62 by gas-liquid separation, a fourth cooler 71 that cools the separated recovered absorption agent vapor 17b, a second gas-liquid separator 56B that separates the recovered absorption agent vapor 17b after cooling into a low-boiling point substance flue gas 72 and a recovered absorbent 17c by gas-liquid separation, a heat exchanger 63 that performs heat exchange of the liquid coexisting substance 62 separated in the first gas-liquid separator 56A with vapor condensed water 27a from vapor 27 supplied to the reclaimer 51 to increase the temperature, a $CO_2$ absorber 64 that brings the liquid coexisting substance 62 after increase in the temperature, and a $CO_2$ gas (recovered $CO_2$) 40 in contact, a second alkaline agent supply section 53B that supplies an alkaline agent 52 to a liquid coexisting substance 62A after absorption of $CO_2$, and a distiller 68 that distills a liquid coexisting substance 62B to which the alkaline agent 52 has been supplied while introducing the $CO_2$ gas (recovered $CO_2$) 40 thereto. Further, a coexisting substance (liquid) 63A is discharged from the distiller 68. Further, $CO_2$ discharged from the $CO_2$ absorber 64 is introduced into the distiller 68 through a $CO_2$ gas introduction line $L_{21}$.

In the present embodiment, the recovered vapor 61 is cooled in the second vapor cooler 55B, and then separated into recovered absorption agent vapor (gas) 17b and the liquid coexisting substance 62 by gas-liquid separation in the first gas-liquid separator 56A.

A volatile low-boiling point substance such as ammonia is entrained in this recovered adsorbent vapor (gas) 17b. Therefore, the recovered adsorbent vapor (gas) 17 is cooled in a fourth cooler 71 and is introduced into the second gas-liquid separator 56B, and the low-boiling point substance flue gas 72 is separated. This separated low-boiling point substance flue gas 72 is introduced into a top of the absorber 18. Reflux water 31 from a $CO_2$ recovery unit 12 is introduced into the fourth cooler 71 to perform cooling.

Further, the temperature of the separated liquid coexisting substance 62 is increased in the heat exchanger 63 by subjecting to heat exchange with the vapor condensed water 27a from the vapor 27 supplied to the reclaimer 51, and the liquid coexisting substance 62 after increase in the temperature is introduced into the $CO_2$ absorber 64 into which a $CO_2$ gas 40 is introduced. In the $CO_2$ absorber 64, the liquid coexisting substance 62 is brought into countercurrent contact, with the recovered $CO_2$ gas 40 to react with $CO_2$. As the $CO_2$ gas 40, the $CO_2$ gas 40 recovered in the $CO_2$ recovery unit 12 is used.

Following that, amines of the absorption agent are made into amines in a free state by supplying the alkaline agent 52 from the second alkaline agent supply section 53B to the liquid coexisting substance 62A, and making a pH of the liquid coexisting substance 62A high (for example, by about 0.3 to 0.5).

Following that, the liquid coexisting substance 62B to which the alkaline agent 52 has been added is introduced into the distiller 68, and in performing distillation here, the coexisting substance 62B absorbs the introduced $CO_2$ gas 40 and is on a liquid side. Therefore, the coexisting substance 62B loses a vapor pressure.

The absorption agent is in a vapor state with a high pH by release of a release valve 67. Therefore, the absorption agent, does not react with the $CO_2$ gas 40 and is separated as vapor by the distillation in the distiller 68.

Here, the $CO_2$ gas 40 introduced into the distiller 68 is $CO_2$ discharged from the $CO_2$ absorber 64 and introduced through the $CO_2$ gas introduction line $L_{21}$.

The coexisting substance (liquid) 63A separated in the distiller 68 is cooled in a coexisting substance cooler 57. Note that, as a refrigerant used in the coexisting substance cooler 57, the reflux water 31 from the $CO_2$ recovery unit 12 is introduced to perform cooling in the present embodiment. Then, the cooled reflux water 31 is introduced into the fourth cooler 71 through a cooling water line $L_{14}$, and then introduced into the reclaimer 51.

An effect of the present embodiment will be described with reference to FIG. 8.

Figure 8:
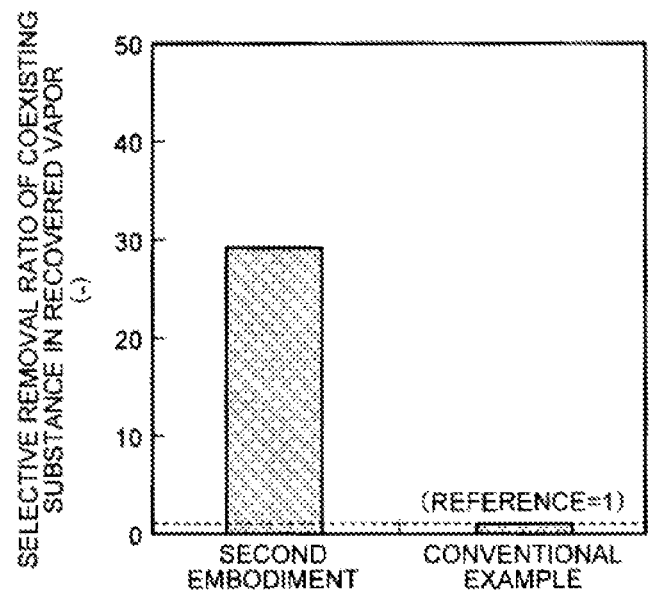
FIG. 8 is a diagram illustrating selective removal ratios in recovered vapor in a conventional example and the second embodiment.

FIG. 8 is a diagram illustrating selective removal ratios in recovered vapor in a conventional example and the second embodiment (where the conventional example is a reference (1)). The conventional technology is a case of recovering the recovered vapor 61 from the reclaimer 51 as it is without providing the first gas-liquid separator 56A and the second gas-liquid separator 56B as in the present embodiment.

The selection removal ratio of the coexisting substance 62 from the recovered vapor 61 in the present embodiment is 30, and the coexisting substance can be substantially removed, where the conventional example is the reference (1).

Figure 9:
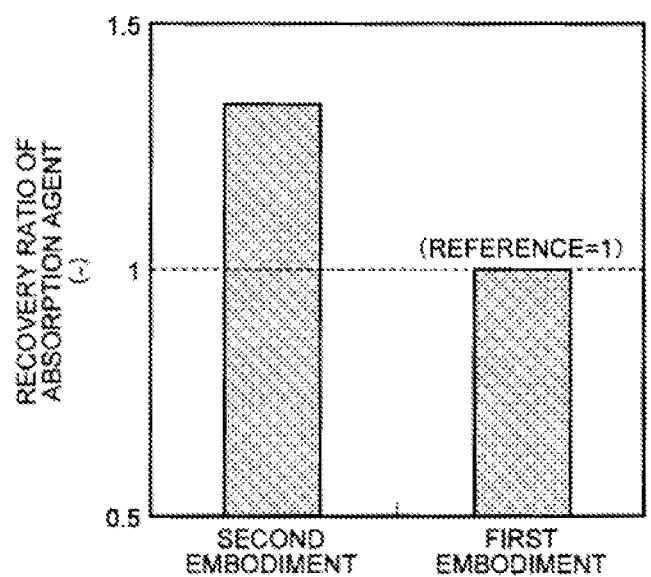
FIG. 9 is a diagram illustrating recovery ratios of an absorption agent in the first embodiment and the second embodiment.

FIG. 9 is a diagram illustrating recovery ratios of the absorption agent in the first embodiment and the second embodiment (where the first embodiment is a reference (1)).

In a case of providing the first gas-liquid separator 56A, the second gas-liquid separator 56B, the $CO_2$ absorber 64, and the distiller 68 as in the second embodiment, the recovery of the absorption agent from the recovered vapor 61 is improved by about 1.3 times.

Next, another reclaiming device according to the second embodiment will be described.

FIG. 5 is a schematic diagram of another reclaiming device according to the second embodiment.

In the present embodiment, as illustrated in FIG. 5, a first cooler 55B-1 that performs cooling with the coexisting substance 62 separated from the recovered vapor 61 in the first gas-liquid separator 56A, a second cooler 55B-2 that performs cooling using the reflux water 31 from a regenerator 20 of the $CO_2$ recovery unit 12, and a third cooler 55B-3 provided at a downstream side of a rich/lean solution heat exchanger 25 disposed in a lean solution supply line $L_1$, and which cools the recovered vapor 61 with a rich solution 19 are included as the second vapor cooler 55B.

Accordingly, when a temperature ($T_1$) of the recovered vapor 61 is 130° C., the recovered vapor is cooled to a temperature ($T_2$=128° C.) by the first cooler 55B-1, then cooled to a temperature ($T_3$=125° C.) by the second cooler 55B-2, and then cooled to a temperature ($T_4$=123° C.) by the third cooler 55B-3.

Here, after the reflux water 31 performs cooling in the fourth cooler 71 for cooling that cools the recovered absorption agent vapor (gas) 17b separated in the first gas-liquid separator 56A, the reflux water 31 is introduced into the second cooler 55B-2 through the cooling water line $L_{14}$, and further performs cooling.

Note that the first cooler 55B-1 is provided at an intersection of the vapor line $L_{12}$ and a liquid coexisting substance discharge line $L_{16}$, the second cooler 55B-2 is provided at an intersection of the vapor line $L_{12}$ and the cooling water line $L_{14}$, and the third cooler 55B-3 is provided at an intersection of the vapor line $L_{12}$ and a rich solution line $L_1$, and thus cooling is possible with heat in the system of the $CO_2$ recovery unit 12.

Third Embodiment

Figure 6:
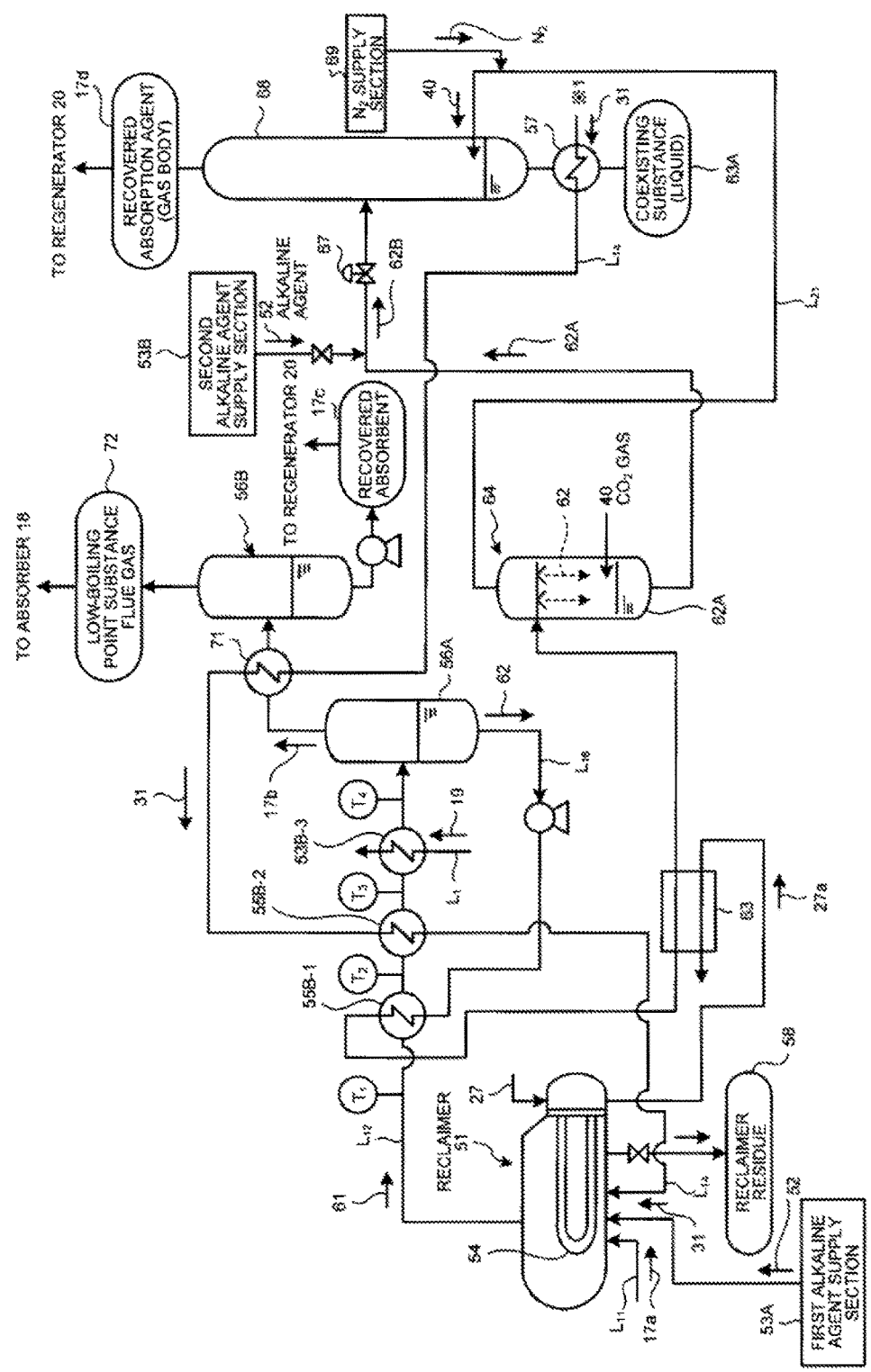
FIG. 6 is a schematic diagram of a reclaiming device according to a third embodiment.

A reclaiming device according to an embodiment of the present invention will be described with reference to the drawing. FIG. 6 is a schematic diagram of a reclaiming device according to a third embodiment. Note that the same member as the first and second embodiments is denoted with the same reference sign, and description thereof is omitted.

As illustrated in FIG. 6, the reclaiming device according to the present embodiment further includes a $CO_2$ gas introduction line $L_{21}$ through which a $CO_2$ gas 40 discharged from a $CO_2$ absorber 64 is introduced into a distiller 68, and a nitrogen supply section 69 that introduces a nitrogen ($N_2$) gas into the $CO_2$ gas introduction line $L_{21}$, in the reclaiming device of the second embodiment.

Since the $N_2$ gas is added to the $CO_2$ gas 40 from the nitrogen supply section 69, a $CO_2$ partial pressure in the distiller 68 can be decreased. In this case, since $N_2$ is mixed in a recovered absorption agent (gas body), it is desirable to supply the $N_2$ gas to a bottom of an absorber 18 in a case of recovering $CO_2$ as a product. When there is no problem with the purity of the $CO_2$ product, the $CO_2$ may be put back to a regenerator 20, as illustrated in FIG. 6.

An effect of the present embodiment will be described with reference to FIG. 10.

Figure 10:
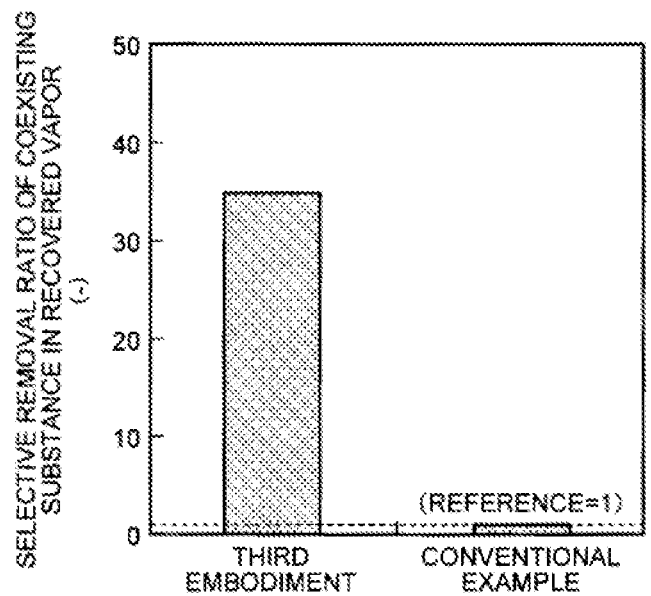
FIG. 10 is a diagram illustrating selective removal ratios in recovered vapor in a conventional example and the third embodiment.

FIG. 10 is a diagram illustrating selective removal ratios in recovered vapor in a conventional example and the third embodiment (where the conventional example is a reference (1)). The conventional technology is a case of recovering the recovered vapor 61 from a reclaimer 51 as it is without providing a first gas-liquid separator 56A, a second gas-liquid separator 56B, a $CO_2$ absorber 64, and the distiller 68 as in the present embodiment.

The selection removal ratio of a coexisting substance 62 from recovered vapor 61 in the present embodiment is 35, and the coexisting substance can be substantially removed, where the conventional example is the reference (1).

Figure 11:
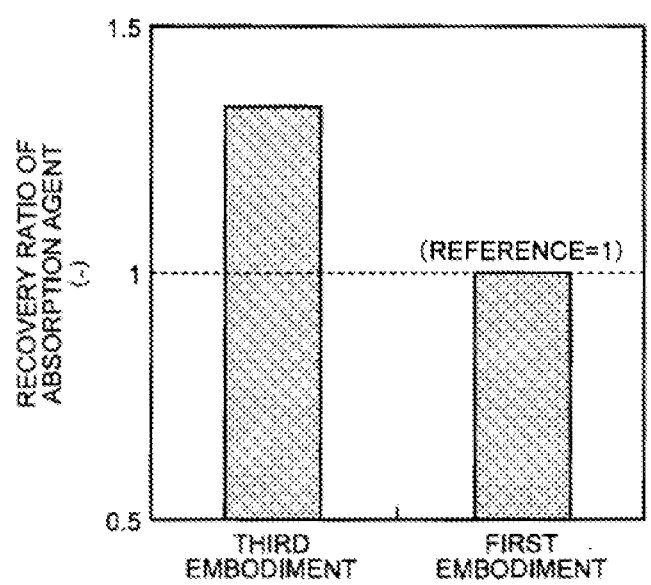
FIG. 11 is a diagram illustrating recovery ratios of an absorption agent in the first embodiment and the third embodiment.

FIG. 11 is a diagram illustrating recovery ratios of the absorption agent in the first embodiment and the third embodiment (where the first embodiment is the reference (1)).

By introduction of nitrogen as in the third embodiment, the $CO_2$ partial pressure is decreased, addition of an alkaline agent 52 can be decreased, and the recovery ratio of the absorption agent from the recovered vapor 61 is improved by about 1.3 times.

REFERENCE SIGNS LIST

12 $CO_2$ recovery unit
13 Industrial combustion facility
14 Flue gas
16 Flue gas cooling device
17 $CO_2$ absorbent (lean solution)
18 $CO_2$ absorber
19 $CO_2$-absorbed $CO_2$ absorbent (rich solution)
20 Absorbent regenerator
21 Rinse water
51 Reclaimer
52 Alkaline agent
55A First vapor cooler
55B Second vapor cooler
56A First gas-liquid separator
56B Second gas-liquid separator
61 Recovered vapor
62 Coexisting substance

The invention claimed is:
1. A reclaiming device comprising:
a reclaimer configured to introduce and store a part of an absorbent regenerated in an absorbent regenerator of a recovery unit that recovers $CO_2$ or $H_2S$ in a gas;

a first alkaline agent supply section configured to supply an alkaline agent to the reclaimer;

a heating section configured to heat the absorbent stored in the reclaimer and to which the alkaline agent has been mixed to obtain recovered vapor;

a second vapor cooler configured to cool the recovered vapor discharged from the reclaimer through a vapor line;

a first gas-liquid separator configured to separate a coexisting substance entrained in the cooled recovered vapor into recovered absorption agent vapor and a liquid coexisting substance by gas-liquid separation;

a cooler configured to cool the separated recovered absorption agent vapor;

a second gas-liquid separator configured to separate the recovered absorption agent vapor after cooling into a low-boiling point substance flue gas and a recovered absorbent by gas-liquid separation;

a heat exchanger configured to perform heat exchange of the liquid coexisting substance separated in the first gas-liquid separator with vapor condensed water from vapor supplied to the reclaimer to increase a temperature;

a $CO_2$ absorber configured to bring the liquid coexisting substance after increase in the temperature and a $CO_2$ gas in contact;

a second alkaline agent supply section configured to supply the alkaline agent to the liquid coexisting substance after absorption of $CO_2$; and a distiller configured to distill the liquid coexisting substance to which the alkaline agent has been supplied while introducing the $CO_2$ gas thereinto.

2. The reclaiming device according to claim 1, wherein the second vapor cooler includes a first cooler configured to perform cooling with the liquid coexisting substance separated from the recovered vapor in the first gas-liquid separator by gas-liquid separation, a second cooler configured to perform cooling with reflux water from the absorbent regenerator, and a third cooler provided at a downstream side of a rich/lean solution heat exchanger disposed in a lean solution supply line, and configured to cool, with a rich solution, the recovered vapor after cooling with the second cooler.

3. The reclaiming device according to claim 1, comprising:

a $CO_2$ gas introduction line configured to introduce the $CO_2$ gas discharged from the $CO_2$ absorber into the distiller; and a nitrogen supply section configured to introduce a nitrogen gas into the $CO_2$ gas introduction line.

* * * * *